Oct. 28, 1958  E. W. MAPLE ET AL  2,857,635
MITER JOINT
Filed Dec. 17, 1956
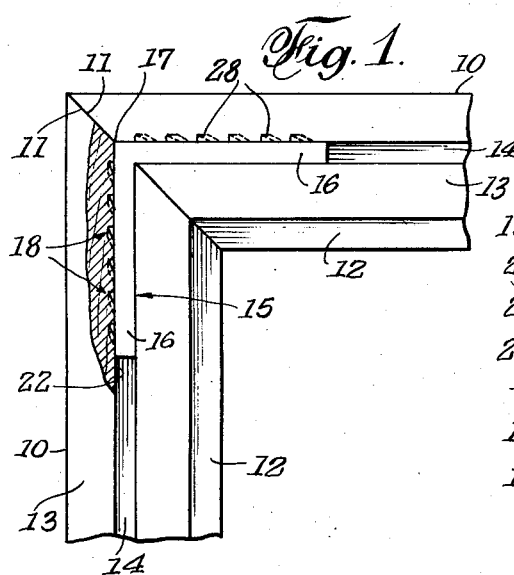
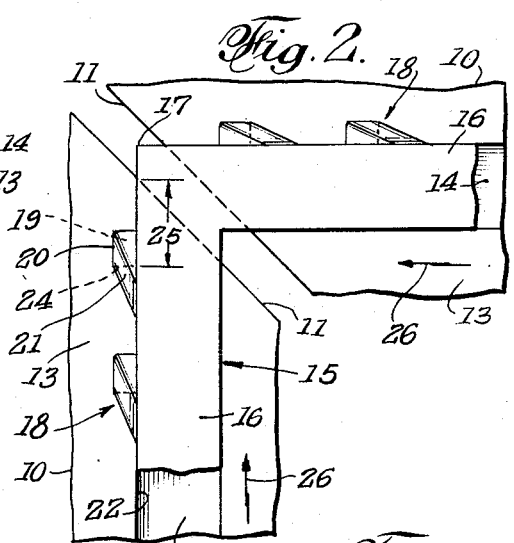
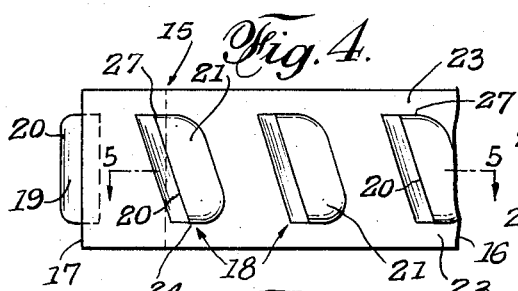
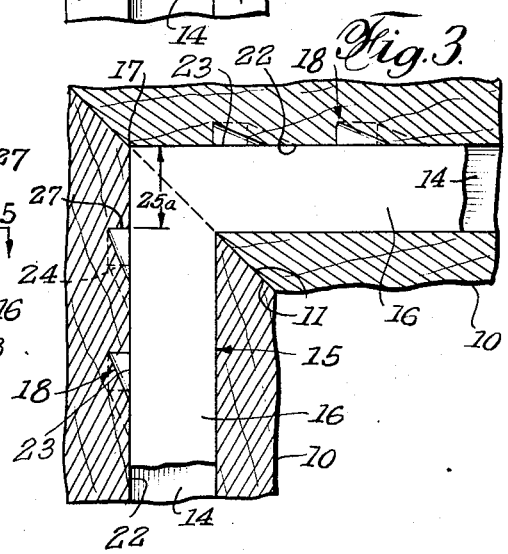
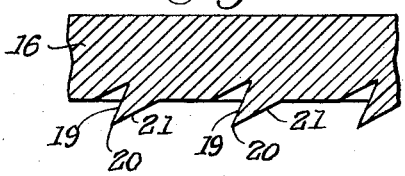
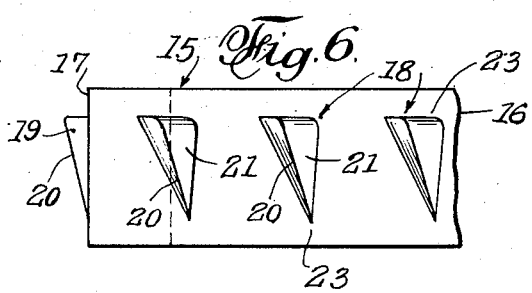
INVENTORS
EARL W. MAPLE
ROBERT L. MAPLE
BENJAMIN F. MILLER, JR.
BY C. H. Stratton
ATTORNEY

United States Patent Office 2,857,635
Patented Oct. 28, 1958

2,857,635

MITER JOINT

Earl W. Maple, Robert L. Maple, and Benjamin F. Miller, Jr., Whittier, Calif., assignors to Maple Bros., Inc., Whittier, Calif., a corporation of California Application December 17, 1956, Serial No. 628,916

10 Claims. (Cl. 20—92)

This invention relates to a miter joint such as used in picture frames and similar corner-provided frames and deals more particularly with a novel connector for miter joints.

Ordinarily, mitered corners are joined or connected by nails, staples and/or glue while the pieces forming the corner are being held in relative position. Since one joint or corner of a frame is frequently affected by strains transmitted from the other joints, particularly where there are some inaccuracies of fit among the various joints, the same tend and frequently do pull apart or, at least, partly open or spread. Under such circumstances, nails will back off, glue will yield to the strain, and staples will not keep desired tightness of the miter joint which will spread, as above indicated.

Recognizing the faults inherent in prior miter-joint connecting means, it is an object of this invention to provide a connector that automatically draws together the mitered faces of two members being joined to provide a tight seam that has as little visible impression on the eye as possible.

Another object of the invention is to provide connecting means of the character referred to that strongly resists forces that may tend to open or spread a miter joint.

A further object of the invention is to provide a miter-joint connector that may be manually pressed into operative engagement with two miter-joint members or, in any case, not requiring more than light tapping to assemble.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, preferred embodiments of the present invention, which are given by way of illustration or example only.

In the drawing, like reference characters designated similar parts in the several views.

Fig. 1 is a rear elevational view of one corner of a frame, the same embodying a connector according to the present invention, and a portion being shown in section.

Fig. 2 is an enlarged and fragmentary rear view showing the relationship of the parts at the beginning of application of the connector.

Fig. 3 is a similarly enlarged sectional view showing the connector in operative position and the joint tightly drawn up by the connector.

Fig. 4 is a fragmentary side view of the connector shown in Figs. 1, 2 and 3.

Fig. 5 is a longitudinal sectional view as taken on line 5—5 of Fig. 4.

Fig. 6 is a view similar to Fig. 4, showing a modification.

Fig. 1 shows two pieces of moulding 10, each being provided with a beveled or mitered end 11, the same being adapted to be abutted to form a miter joint. While said pieces are shown with picture-accommodating rabbets 12, such as would be provided in a picture frame, it will be clear that said pieces 10 may comprise any two joint-connected members whether or not they are part of a complete frame.

According to the present invention, the rear face 13 of each piece 10 is provided with a preferably rectangular-sectioned groove 14. It will be clear, of course, that said grooves are similarly placed in both pieces that are being connected as are the rabbets 12, if used.

The connector 15 of the present invention comprises a preferably metallic member, aluminum alloy being preferred, but capable of being made of any other suitable metal or even of a hard and tough, fracture-resistant plastic. In any case, the connector 15 should have limited or no flexibility to insure rigidity of the joint connected thereby.

The connector 15 preferably comprises an angle member having two substantially similar arms or legs 16 that have a cross-sectional size and form to snugly fit the grooves 14 in either flush or slightly under-flush condition. The corner 17 that integrally connects legs 16, is preferably sharp, as shown. For a 45° miter, the angle included between said legs would be a right angle; for other angled miters the included angle will vary accordingly.

At least one side face of each leg 16 is provided with one or more cam wedges 18, the same being integrally formed by upsetting the material of the corrector. Each cam wedge is provided with a face 19 that is directed toward the corner 17 and is disposed at an angle to said corner in the general manner shown in Fig. 4. Each face 19 terminates along a sharp edge 20 where the same meets the angled surface 21 that slopes back to the plane of the side face in which the cam wedges are provided.

In the form of Fig. 1, the faces 19 and the edges 20 of the cam wedges are substantially as above described, the faces 21, however, instead of the rectangular form of Fig. 4, are triangular as shown, the same resulting from upsetting the metal more at one end than at the other. Except that faces 19 of Fig. 6 have lesser areal size, the same are as effective for the present purpose as the faces 19 of Fig. 4.

Since the sharp edges 20 are pressed into the side faces 22 of grooves 14, the form of Fig. 6 has the advantage of a tapered lead-in, enabling manual assembly of the miter with little expenditure of force.

It will be noted that the cam wedges 21 are substantially shorter than the width of the legs on which provided, thereby leaving at both edges of said legs plane portions 23 that readily fit into grooves 14.

When a joint is to be connected, the two pieces 10 are placed with their bended ends 11 in spaced relation substantially as shown in Fig. 2. The connector 15, with the cam wedge faces 19 directed, from the top down, away from corner 17, is placed with the lower plane portions 23 in grooves 14. When so positioned, the lower edge 24 of the cam wedge nearest corner 17 will be at a distance 25 from where the portion 23 intersects the bevel end 11. It will be understood that said edge 24, at this stage is resting upon the rear face 13 of the piece. Fig. 2 shows this condition.

Now, the connector 15 is pressed into the grooves 14 or the same is tapped into the grooves. Since faces 19 constitute cams or wedges, the same bite into the faces 22 of the groove and by reason of their slope, force the pieces to move toward each other in the direction of arrows 26 until the miter or bevel edges 11 are brought into firm contact, as shown in Fig. 3, wherein the final position will bring the upper edge 27 of the cam wedge nearest corner 17 to a distance 25a from where the portion 23 meets the bevel 11. In this case, the corner 17 is coincident with the point of meeting.

In practice, the initial relative position of the ends 11 is preferably such as to cause a squeezing together of these faces when the connector 15 is fully seated in grooves 14, thereby insuring a tight joint with a seam of minimum visibility.

If the pieces 10 are formed of certain soft woods, pine, for instance, after the upper edges 27 of the cam wedges have reached their position below the level of face 13, the grooves cut into the sides 22 of grooves 14 by said wedges, will heal in whole or in part, due to spring-back of the soft wood. Since, as indicated, said upper edges 27 are underflush with respect to faces 13, the parts 23 of the pieces 10 that spring back in this manner serve as means resisting retractive movement of the connectors. Fig. 1 shows that the grooves cut by the cam wedges have been healed by the parts 23 and that such healing is effective against the upper plane portions 23 of the legs 16.

The cam wedges may be provided on the inner faces of legs 16 or on both inner and outer faces, as desired. Also, the application of the connector may be guided as by an arrow or other marking to insure that the wedges 18 are directed to pull the pieces 10 together.

While the foregoing has illustrated and described what are now contemplated to be the best modes of carrying out our invention, the constructions are of course, subject to modification without departing from the spirit and scope of the invention. It is, therefore, not desired to restrict the invention to the particular forms of construction illustrated and described, but to cover all modifications that may fall within the scope of the appended claims.

Having thus described our invention, what we claim and desire to secure by Letters Patent is:

1. A connector to form a miter joint between two bevel-ended pieces, each piece having an open groove, said connector comprising a member having two legs arranged to form an included angle and of a size to fit the grooves of said pieces when the beveled ends thereof are placed in juxtaposition, said legs being each provided with at least one cam wedge disposed at such an angle that the same draws the bevel ends of the pieces together during full insertion of the connector into the mentioned grooves from the open sides of the grooves.

2. A connector to form a miter joint between two bevel-ended pieces, each piece having an open groove, said connector comprising a member having two legs arranged to form an included angle and of a size to fit the grooves of said pieces when the beveled ends thereof are placed in juxtaposition, said legs being each provided with at least one cam wedge that cuts into a face of the groove in which it is engaged and is disposed at such an angle as to press against the cut grooves in a direction to move the bevel ends of the pieces toward each other during full insertion of the connector into the grooves provided in the pieces from the open sides of the grooves.

3. A connector according to claim 2 in which each of the cam wedges is integrally formed from upset portions of the mentioned legs.

4. A connector according to claim 2 in which each of the cam wedges is integrally formed from upset portions of the mentioned legs, each said portion comprising a wedging face directed at the angle referred to, and a cutting edge forming an end of said faces and facilitating entry of the connector into operative position.

5. A connector according to claim 2 in which the cam wedges extend across an intermediate portion of the face of each leg on which provided, the ends of the cam wedges and the opposite edges of the legs defining plane portions that have non-cutting entry into the grooves in the pieces joined by the connector.

6. A miter-joint connector comprising an angle member having legs normal to each other, one side face of each leg being provided with at least one cam wedge, and each such cam wedge having a face that slopes with respect to a normal transverse line across said face.

7. A miter-joint connector according to claim 6 in which the cam wedges reside in the intermediate portions of the legs on which provided and the ends thereof are spaced from the edges of the legs to define plane portions.

8. A miter-joint connector comprising an angle member having legs normal to each other, one side face of each leg being provided with at least one cam wedge, and each such cam wedge having a face that slopes with respect to a normal transverse line across said face, each said sloping face terminating in a sloping cutting edge that is outwardly offset from the plane of each respective leg.

9. A miter-joint connector according to claim 8 in which each sloping face constitutes a triangular wedge face and the cutting edge is at an angle to the plane of each respective leg.

10. A miter-joint connector according to claim 8 in which each sloping face constitutes a substantially rectangular wedge face and the cutting edge is parallel to the plane of each respective leg.

References Cited in the file of this patent

UNITED STATES PATENTS

| | | |
|---|---|---|
| 810,808 | Pittman | June 23, 1906 |
| 920,808 | Alcott | May 4, 1909 |
| 958,546 | Rossmeisl | May 17, 1910 |
| 1,959,360 | Heyser | May 22, 1934 |